United States Patent [19]

Leeb

[11] 4,093,354
[45] June 6, 1978

[54] METHOD AND APPARATUS FOR SPLITTING A BEAM OF ENERGY

[76] Inventors: James C. Fletcher, Administrator of the National Aeronautics and Space Administration, with respect to an invention of, Walter Robert Leeb, Seabrook, Md.

[21] Appl. No.: 643,897

[22] Filed: Dec. 23, 1975

[51] Int. Cl.² ............................ G02B 27/17; G02B 5/04
[52] U.S. Cl. .................................... 350/320; 350/170; 350/173; 350/174; 350/286
[58] Field of Search .......................... 350/169–174, 350/286, 276 SL, 96 R, 167, 320, 280–282

[56] References Cited

U.S. PATENT DOCUMENTS

| 2,631,498 | 3/1953 | Barkley | 350/281 |
| 3,001,015 | 9/1961 | Weiss | 350/152 X |
| 3,520,594 | 7/1970 | Kurz | 350/281 |
| 3,806,257 | 4/1974 | Amos | 350/286 X |

OTHER PUBLICATIONS

Franzen, Article in Applied Optics, vol. 14, No. 3, Mar. 1975, pp. 647–652.

*Primary Examiner*—Jon W. Henry
*Attorney, Agent, or Firm*—Robert D. Marchant; John R. Manning; John O. Tresansky

[57] ABSTRACT

A method of forming two diverging beams of energy from a single beam of energy including the steps of splitting the single beam of energy into an externally reflected beam and an internally transmitted beam at a first surface on a wedge shaped energy beam splitting device; splitting the internally transmitted beam into an internally reflected beam and an externally transmitted beam at a second surface of the wedge shaped energy beam splitting device, and substantially totally reflecting the internally reflected beam between the first and second surfaces until the internally reflected beam reaches an end of the wedge shaped energy beam splitting device. The above method may further include steps paralleling the above steps wherein two diverging beams of energy are formed from a second beam of energy impinging on the second surface and then combining the two diverging beams with the two diverging beams formed from the beam of energy split by the first surface, to form first and second combined beams. The preferred apparatus for performing the method is an energy beam splitting device having a first surface for splitting an incident beam energy into an externally reflected beam and an internally transmitted beams, a second surface spaced from the first surface for splitting the internally transmitted beam into an externally transmitted beam and into an internally reflected beam, and the second surface intersecting the first surface at an angle that impinges the internally transmitted beam on the second surface at an angle of incidence that is less than the minimum angle necessary for substantially total internal reflection and impinges said internally reflected beam on the first surface at an angle of incidence that exceeds the minimum angle necessary for substantially total internal reflection. The above device may further be used as a beam combiner by having the second surface split a second incident beam of energy into two diverging beams of energy and combining the two beams produced by the first surface with the two beams produced by the second surface to form first and second combined beams.

13 Claims, 4 Drawing Figures

METHOD AND APPARATUS FOR SPLITTING A BEAM OF ENERGY

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

This invention relates generally to optics in which a single channel is changed to plural channels and more particularly to a method and apparatus for splitting a beam of energy into two diverging beams of energy without interference from secondary images.

2. Description of the Prior Art

Energy beam splitters, and in particular optical energy beam splitters, are extremely useful in industries where a beam of energy is split into two beams of energy and each resultant beam is used for a particular function.

One such use of beam splitters is in optical communication systems which utilize a transmitter and a remote receiver. The transmitter utilizes a LASER to produce an optical LASER beam carrier on which modulated information is placed. An optical beam splitter is placed in the path of the optical carrier to split the optical carrier into two primary beams. One primary beam is modulated with the information and travels to the receiver. The other primary beam is used in a feedback circuit to keep the frequency and amplitude of the LASER beam carrier constant. The receiver uses an optical beam combiner to split an optical signal produced by a local oscillator and impinging on the optical beam combiner into two beams of energy and to split the incoming modulated optical carrier impinging thereon into two beams of energy and then combining the resultant beams of energy into a pair of combined beams. One of the combined beams is detected by an optical detector in the receiver. This first combined beam improves the sensitivity of the detector. The second combined beam is fed back to the local oscillator for controlling the same. Beam splitting devices are also useful in the field of holography and in optical instruments such as interferometers where two beams are used to produce interference patterns.

Typically, energy beam splitters consist of a plane parallel or substantially plane parallel piece of polished transparent material having a first and second surface. An incoming beam of energy is picked up by the first surface and the incoming beam of energy is split by the first surface into an externally reflected beam and an internally transmitted beam. The transmitted beam is split by the second surface into an externally transmitted beam and an internally reflected beam. The externally reflected and transmitted beams are the two primary useful beams.

Although the typical plane parallel beam splitter splits the incoming beam into two resultant energy beams, it does have a distinct disadvantage in that when the internally reflected beam is reflected back to the first surface it is split into a second externally transmitted beam and a second internally reflected beam. The second internally reflected beam is split into a third externally transmitted beam and a third internally reflected beam at the second surface. These multiple internal reflections which result in multiple externally transmitted and reflected beams continue throughout the energy beam splitter. The multiple externally transmitted beams interfere with the primary externally reflected and transmitted beams causing detrimental effects. These detrimental effects are that each of the secondary transmitted and reflected beams will combine with the primary transmitted and reflected beams causing a change in intensity of the primary transmitted and reflected beams. It then becomes extremely difficult to properly predict the intensities of the externally reflected and transmitted beams because they are dependent on precise knowledge of the thickness of the beam splitter, the index of refraction, and the angle of incidence of the incoming beam.

In the past, anti-reflective coatings have been applied to the second surface to eliminate the internally reflected beam, however, due to the imperfections in the coatings they have not been successful in completely eliminating the partial external transmissions of the internal reflections. Another device used is a slightly wedge shaped energy beam splitter which eliminates direct interference by the secondary transmitted and reflected beams by separating them from the primary externally reflected and transmitted beams, however, the energy beam splitter still produces the unwanted secondary externally transmitted and reflected beams which are substantially collinear with the primary externally reflected and transmitted beams and therefore are detrimental to the detection of the primary externally reflected and transmitted beams.

When the energy beam splitting device is used as a beam combiner the same detrimental effects are inherent therein as previously described for the typical energy beam splitting device.

SUMMARY OF THE INVENTION

Accordingly, one object of this invention is to provide a novel method of forming two diverging beams of energy from a single beam of energy.

Another object of the invention is to provide a novel method of preventing secondary beams of energy from interfering with the two diverging beams of energy.

Still another object of the invention is to provide a novel method of producing two diverging beams of energy whose intensities will remain substantially constant.

A further object of the instant invention is to provide a novel method of splitting two beams of energy into four diverging beams of energy and combining the four resultant beams into a pair of combined beams.

A still further object is to provide a new and improved energy beam splitting device for splitting a single beam of energy into two diverging beams of energy.

Another still further object of this invention is the provision of a new and improved energy beam splitting device that prevents secondary beams from interfering with the two diverging beams of energy.

One other object of this invention is the provision of a new and improved energy beam combining device that splits two beams of energy into four beams of energy and combines the four beams into a pair of combined beams.

Briefly, in accordance with one embodiment of this invention, these and other objects are attained by providing a method of forming two diverging beams of energy from a single beam of energy having the steps of splitting the single beam of energy into an externally reflected beam and an internally transmitted beam at a second surface on a wedge shaped energy beam splitting device, splitting the internally transmitted beam into an internally reflected beam and an externally transmitted beam at a second surface on the wedge shaped energy beam splitting device, and substantially totally reflecting the internally reflected beam between the first and second surface until the internally reflected beam reaches an end of the wedge shaped beam splitting device.

In accordance with a further feature of the invention the above method may include the steps of splitting a second beam of energy into an externally reflected beam and an internally transmitted beam at the second surface on the wedge shaped energy beam splitting device, splitting the internally transmitted beam into a first internally reflected beam and a first externally transmitted beam at the first surface, splitting the first internally reflected beam into a second internally reflected beam and a second externally transmitted beam at the second surface, combining the externally reflected beam, formed from the first beam of energy incident on the first surface, with the first externally transmitted beam to form a first combined beam, combining the externally transmitted beam, formed from the first beam of energy incident on the first surface, with the second transmitted beam to form a second combined beam, and substantially totally reflecting the second internally reflected beam between the first and second surfaces until the second internally reflected beam reaches the end of the wedge shaped energy beam splitting device.

Further, in accordance with an additional embodiment there is provided an energy beam splitting device having a first surface for splitting an incident beam of energy into an externally reflected beam and an internally transmitted beam, a second surface spaced from the first surface for splitting the internally transmitted beam into an internally reflected beam and an externally transmitted beam, and the second surface intersecting the first surface at an angle that impinges the internally transmitted beam on the second surface at an angle of incidence that is less than the minimum angle necessary for substantially total internal reflection and impinges the internally reflected beam on the first surface at an angle of incidence that exceeds the minimum angle necessary for substantially total internal reflection.

Additionally, a further feature of the energy beam splitting device is to have the second surface split a second incident beam thereon into an externally reflected beam and an internally transmitted beam, the first surface receiving and splitting the internally transmitted beam into a first externally transmitted beam for combining with the externally reflected beam, formed from the first energy beam incident on the first surface, to form a first combined beam and into a first internally reflected beam, and the second surface receiving and splitting the first internally reflected beam into a second externally transmitted beam for combining with the externally transmitted beam, formed from the first energy beam incident on the first surface, to form a second combined beam and into a second internally reflected beam.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings wherein like parts are marked alike.

DESCRIPTION OF THE PREFERRED EMBODIMENT

Generally, the method of forming two diverging beams of energy from a single beam of energy includes the steps of, splitting the single beam of energy into an externally reflected beam and an internally transmitted beam at a first surface of a wedge shaped energy beam splitting device, splitting the internally transmitted beam into an internally reflected beam and an externally transmitted beam at a second surface on the wedge shaped energy beam splitting device, and substantially totally reflecting the internally reflected beam between the first and second surfaces until the internally reflected beam reaches an end of the wedge shaped energy beam splitting device.

Figure 1:
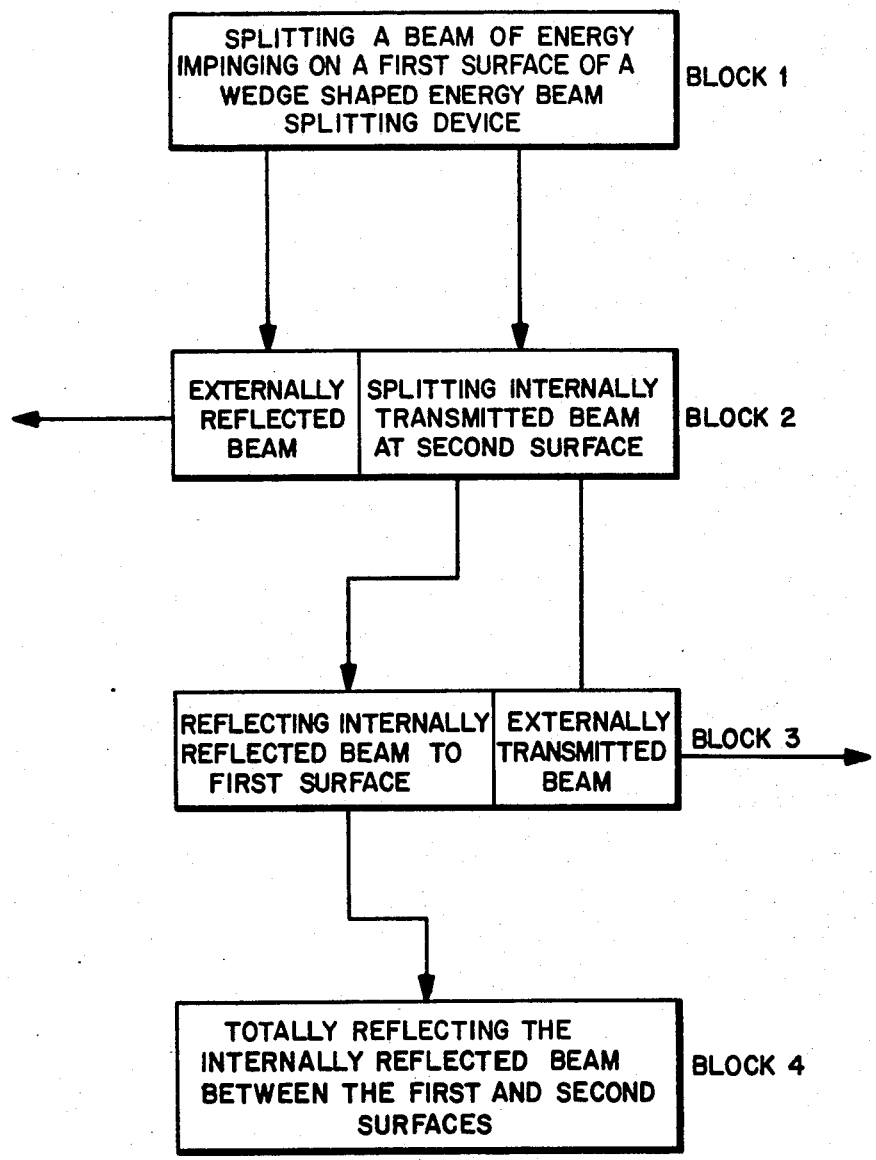
FIG. 1 is a block flow diagram showing the process steps of forming two diverging beam of energy from a single beam of energy.

More specifically, and referring to FIG. 1, block 1 illustrates the step of splitting an impinging beam of energy on a first surface of a wedge shaped energy beam splitting device into an externally reflected beam as shown by the arrow from block 1 to the left side of block 2 and into an internally transmitted beam as shown by the arrow from block 1 to the right side of block 2. It should be understood that when the first surface splits the impinging incident beam, the resultant two beams each have a lesser intensity than the incident beam.

Referring to the left side of block 2, the externally reflected beam propagates away from the wedge shaped energy beam splitting device as shown by the arrow. The externally reflected beam is one of the useful primary beams that can be later used such as, for example, the carrier beam on which information is modulated. The right side of block 2, illustrates the step of splitting the internally transmitted beam at the second surface, after it has traversed through the wedge shaped energy beam splitting device, into an externally transmitted beam as shown by the arrow from the right side of block 2 to the right side of block 3 and into an internally reflected beam as shown by the arrow from the right side of block 2 to the left side of block 3. Again, it should also be understood that when the second surface splits the internally transmitted beam the resultant two beams each have a lesser intensity than the internally transmitted beam.

Referring to the right side of block 3, the externally transmitted beam propagates away from the energy beam splitting device as shown by the arrow and is the other useful primary beam that can be later used such as, for example, in a feedback circuit in a LASER transmitter to stabilize the frequency and amplitude of the optical beam. The left side of block 3 illustrates the step of reflecting the internal reflected beam back to the first surface where it is substantially totally internally reflected. The internally reflected beam is substantially totally reflected to the second surface and alternately between the first and second surfaces until it reaches the end of the wedge shaped energy beam splitting device as shown by the arrow from the left side of block 3 to block 4.

The step of substantially totally reflecting the internally reflected beam as shown in block 4 of FIG. 1 includes the steps of impinging the internally transmitted beam on the second surface at an angle of incidence that is less than the minimum angle necessary for substantially total internal reflection, and impinging the internally reflected beam on the first surface at an angle of incidence that exceeds the minimum angle necessary for substantially total internal reflection.

The step of substantially totally internally reflecting the internally reflected beam further includes the step of forming the first and second surface at an angle to each other that impinges the internally transmitted beam on the second surface at the angle of incidence that is less than the aforementioned minimum angle and impinges the internally reflected beam on the first surface at the angle of incidence that exceeds the aforementioned minimum angle.

The step of reflecting the internally reflected beam to the end of the wedge shaped energy beam splitting device further includes the step of diffusely scattering the internally reflected beam from the end so as not to interfer with the externally reflected and transmitted beams.

The above method may further include the step of coating the first surface with a partially reflective coating to intensify the externally reflected beam. In addition, in lieu of or in conjunction with the step of coating the first surface with a partially reflective coating, the method can further include the step of coating the second surface with a substantially anti-reflective coating to intensity the externally transmitted beam.

Figure 2:
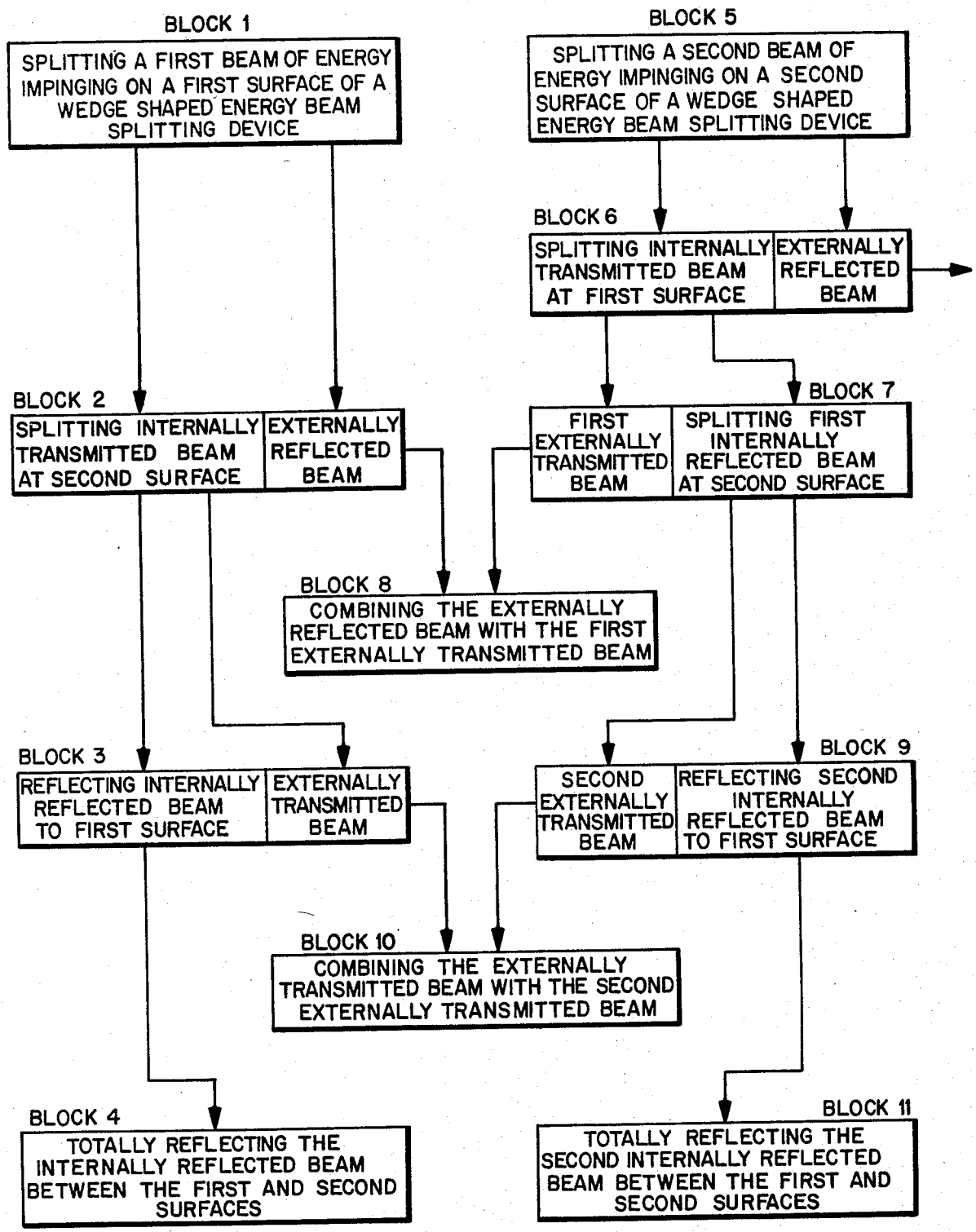
FIG. 2 is a block flow diagram showing the process steps of splitting two beams of energy into two diverging beams each and combining the resultant beams into a pair of first and second combined beams.

Referring to FIG. 2, the above method may include the steps as illustrated in blocks 5-11. Blocks 1-4 are the same steps as illustrated in blocks 1-4 of FIG. 1 and therefore will not be further described except where necessary to describe the steps in blocks 5-11. Referring to block 5, the above method may include the step of splitting a second incident energy beam derived, for example, from a local optical oscillator on the second surface of the wedge shaped energy beam splitting device into an externally reflected beam as shown by the arrow from block 5 to the right side of block 6 and into an internally transmitted beam as shown by the arrow from block 5 to the left side of block 6. It should be understood that when the second surface splits the second incident beam, the resultant two beams each have a lesser intensity than the second incident beam.

Referring to the right side of block 6, the externally reflected beam propagates away from the wedge shaped energy beam splitting device as shown by the arrow. This externally reflected beam is not the useful primary beam, however, it will have very little detrimental effect on the primary beam since it is divergent from the primary beam (to be explained later). The left side of block 6 illustrates the step of splitting the internally transmitted beam at the first surface after it has traversed through the wedge shaped energy beam splitting device into a first externally transmitted beam as shown by the arrow from the left side of block 6 to the left side of block 7 and into a first internally reflected beam as shown by the arrow from the left side of block 6 to the right side of block 7. Again, it should be understood that each resultant beam has a lesser intensity than the internally transmitted beam.

In block 8 the step of combining the externally reflected beam from the right side of block 2 with the first externally transmitted beam from the left side of block 7 to form a first combined beam is illustrated. This first combined beam is propagated away from the wedge shaped energy beam splitting device and is the first useful primary combined beam which can be detected by a conventional energy beam detector for extraction of modulated information contained thereon.

The right side of block 7 illustrates the step of splitting the first internally reflected beam at the second surface after traversing the wedge shaped energy beam splitting device into a second externally transmitted beam as shown by the arrow from the right side of block 7 to the left side of block 9 and into a second internally reflected beam as shown by the arrow from the right side of block 7 to the right side of block 9. Again, it should be understood that the two resultant beams each have a lesser intensity than the first internally reflected beam.

In block 10 the step of combining the externally transmitted beam from the right side of block 3 with the second externally transmitted beam from the left side of block 9 to form a second combined beam is illustrated. This second combined beam is propagated away from the wedge shaped energy beam splitting device and is the second useful primary combined beam which can be used such as, for example, for controlling the local oscillator in the optical communication receiver which produces the second incident beam on the second surface of the wedge shaped energy beam splitting device.

The right side of block 9 illustrates the step of reflecting the second internally reflected beam back to the first surface where it is substantially totally internally reflected. The second internally reflected beam is substantially totally reflected to the second surface and alternately between the first and second surfaces until it reaches the end of the wedge shaped energy beam splitting device as shown by the arrow from the right side of block 9 to block 11.

The step of substantially totally internally reflecting the second internally reflected beam as shown in block 11 includes the steps of impinging the first internally reflected beam, formed from the second optical beam incident on the second surface, on the second surface at an angle of incidence that is less than the minimum angle necessary for substantially total internal reflection, and impinging the second internally reflected beam on the first surface at an angle of incidence that exceeds the minimum angle necessary for substantially total internal reflection.

The above step of substantially totally internally reflecting the second internally reflected beam is accomplished by including the step of forming the first and second surfaces at an angle to each other in the same manner as previously described for FIG. 1 and therefore will not be described further.

The step of substantially totally internally reflecting the second internally reflected beam further includes the step of impinging the internally transmitted beam, which is formed from the second optical beam incident on the second surface, on the first surface at an angle of incidence that transmits the first externally transmitted beam, the first internally reflected beam the second externally transmitted beam, and the second internally reflected beam, all of which are formed from the second optical beam incident on the second surface, substantially parallel to the externally reflected beam, the internally transmitted beam, the externally transmitted beam, and the internally reflected beam respectively, all of which are formed from the first optical beam incident on the first surface. This step not only assures that the second reflected beam will be substantially totally internally reflected but also assures that the first externally transmitted beam, which is formed from the second beam, will be parallel to and combine with the externally reflected beam which is formed from the first beam, to form the first combined beam. In addition, it assures that the second externally transmitted beam, which is formed from the second beam, will be parallel to and combine with the externally transmitted beam, which is formed from the first beam, to form the second combined beam.

The step of reflecting the second internally reflected beam to the end of the wedge shaped energy beam splitting device further includes the step of diffusely scattering the second internally reflected beam from the end so as to not interfere with the first and second combined beam.

Figure 3:
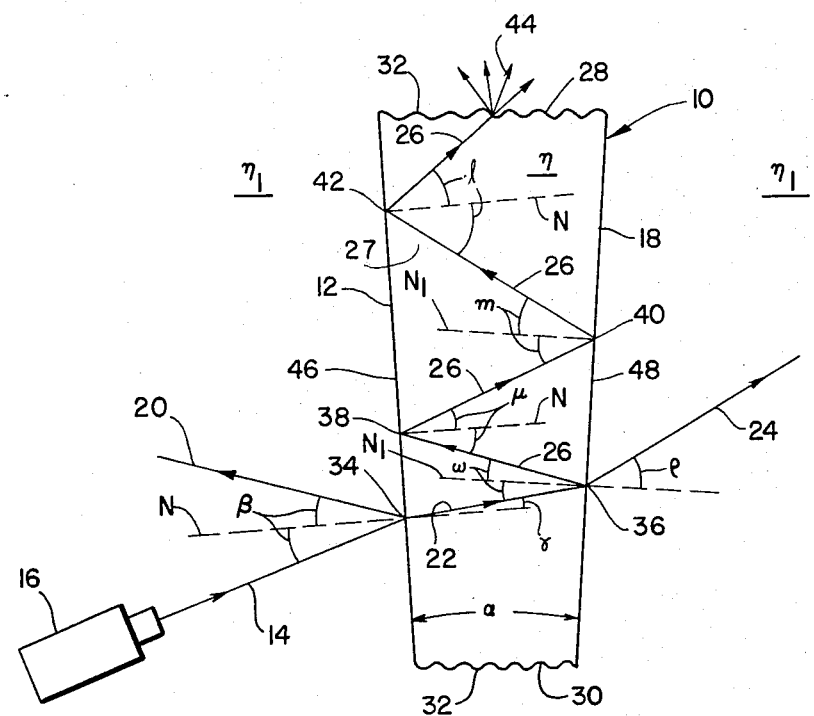
FIG. 3 is a schematic diagram of the apparatus for performing the process steps of FIG. 1 showing the energy beam splitting device, the incident beam, the resultant beams and the internally reflected beam.

Referring to FIG. 3, the preferred apparatus for performing the above described method of FIG. 1 is shown as generally composed of an energy beam splitting device denoted generally by numeral 10 having a first surface 12 for splitting an incident beam of energy 14 derived from an energy beam producing apparatus 16 into an externally reflected beam 20 and an internally transmitted beam 22. A second surface 18 is spaced from first surface 12 for splitting the internally transmitted beam 22 into an externally transmitted beam 24 and into an internally reflected beam 26. Second surface 18 intersects first surface 12 at an angle α that impinges internally transmitted beam 22 on second surface 18 at an angle of incidence ω that is less than the minimum angle necessary for substantially total internal reflection and impinges internally reflected beam 26 on first surface 12 at an angle of incidence μ that exceeds the minimum angle necessary for substantially total internal reflection.

Figure 4:
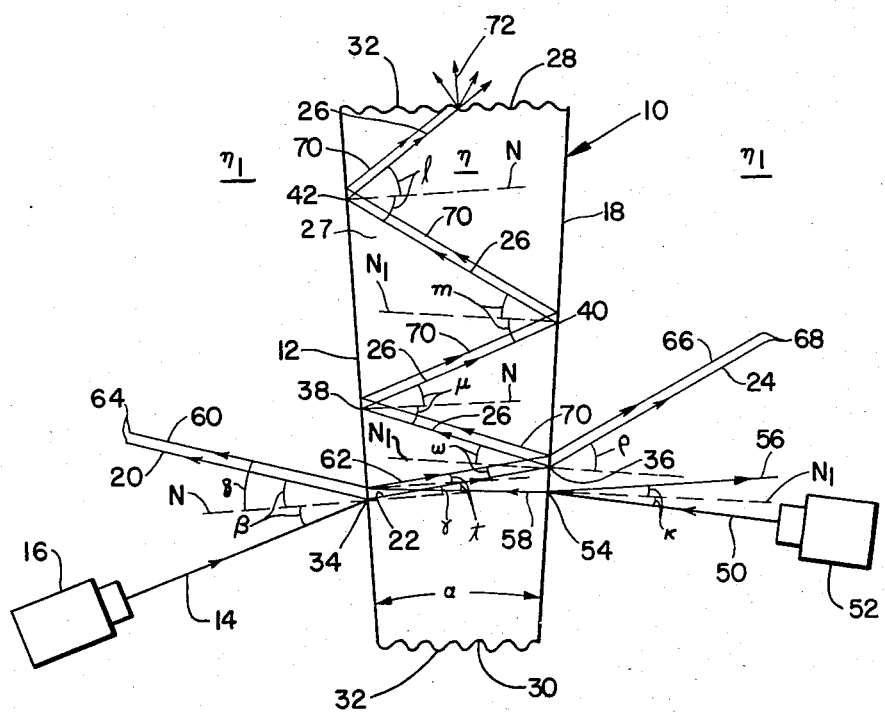
FIG. 4 is a schematic diagram of the apparatus for performing the process steps of FIG. 2 showing the energy beam splitting device, the two incident beams, the combined resultant beams and the internally reflected beams.

More specifically, the apparatus used for splitting a single beam of energy 14 onto two diverging beams of energy 20 and 24 while totally internally reflecting internally reflected beam 26 so no other beams are transmitted beyond surfaces 12 and 18 is energy beam splitting device 10. Energy beam splitting device 10 is preferably a substantially transparent prism. The cross-section of the prism forming substantially truncated isosceles triangle sides 27 (only one shown) when the cross-section is taken perpendicular to the sides. The base of the truncated isosceles triangle sides 27 forms a wide end 28 and the other end of sides 27 forms a narrow end 30 of the prism or energy beam splitting device 10. Energy beam splitting device 10 has a first surface 12 extending perpendicular to sides 27 and a second surface 18 opposed from first surface 12 and extending perpendicular to sides 27. First and second surfaces 12 and 18, respectively, are formed at an angle α to each other. Although FIGS. 3 and 4 show a cross section of energy beam splitting device 10 as being shaped as a truncated isosceles triangle, energy beam splitting device 10 may be formed in the shape of a disk (not shown) wherein end 30 is eliminated and end 28 forms the outer periphery of the disk.

Energy beam splitting device 10 is made from any transparent material such as, for example, glass, quartz, and zinc-selenide which has an index of refraction $\eta$ greater than the index of refraction $\eta_1$ of the surrounding medium such as air. First and second surfaces 12 and 18, respectively, are preferably polished to a substantially smooth surface so that the various beams incident on surfaces 12 and 18 will not be diffusely scattered in various directions by any deformations thereon. If energy beam splitting device 10 is rectangular in shape ends 28 and 30 are formed with plurality of spaced ridges 32 extending along the length (not shown) of energy beam splitting device 10. The function of ridges 32 on ends 28 and 30 will be explained in detail later. If energy beam splitting device 10 is a disk (not shown) outerperiphery 28 is formed with spaced ridges 32 extending around the outer circumference thereof.

For energy beam splitting device 10 to split a single beam of energy 14 into two beams of energy 20 and 24 an energy beam producing apparatus 16 is provided which produces an energy beam 14 which when properly directed will be incident on first surface 12. Energy beam producing apparatus 16 may be any conventional apparatus which is capable of producing a beam of energy. Preferably, however, energy beam producing apparatus 16 is an apparatus that produces a beam of optical energy such as, for example, a conventional LASER, tungsten lamp, carbon arc lamp, metallic arc lamp, burning flame, or an electrical spark. In addition, energy beam splitting device 10 splits optical energy beams produced in a wide range of frequencies, such as, for example, optical energy having frequencies in the ultraviolet, visible, and infrared frequency ranges.

It is most preferred that the optical energy beam producing apparatus 16 be capable of producing a substantially non-diverging beam of optical energy such as produced by a conventional LASER. The optical energy beam producing apparatus 16 when it is a LASER, produces substantially nondiverging optical energy beam 14 which travels by an optical path to point 34 on first surface 12 of energy beam splitting device 10. Preferably, optical energy beam 14 impinges on first surface 12 at point 34 and at an angle less than perpendicular to first surface 12 thereby forming an angle of incidence $\beta$ with the normal N to first surface 12 so that a reflected beam 20 will be produced.

More particularly as optical energy beam 14 impinges on first surface 12 at point 34 at an angle of incidence $\beta$, first surface 12 will partially reflect optical energy beam 14 as an externally reflected beam 20 away from first surface 12 of energy beam splitting device 10 at an angle of reflection which is the same as the angle of incidence $\beta$ for optical energy beam 14. Externally reflected beam 20 is one of two beams produced by energy beam splitting device 10 that is considered a primary useful beam and is used such as, for example, an optical carrier beam upon which information is modulated in the well known manner (not shown). In addition to producing externally reflected beam 20, first surface 12 partially transmits optical energy beam 14 as an internally transmitted beam 22 through energy beam splitting device 10 and impinges on second surface 18 at a point 36. It will be assumed that the index of refraction $\eta$ is greater than the index of refraction $\eta_1$ and therefore internally transmitted beam 22 will be refracted within energy beam splitting device 10 at an angle of refraction $\gamma$ with normal N. The angle of refraction $\gamma$ is less than the angle of incidence $\beta$ when the index of refraction $\eta$ is greater than the index of refraction $\eta_1$.

When internally transmitted beam 22 impinges on second surface 18 at point 36 it will do so at an angle of incidence $\omega$ with normal $N_1$. Second surface 18 partially internally reflects internally transmitted beam 22 as an internally reflected beam 26 at an angle of reflection which is the same as the angle of incidence $\omega$ of internally transmitted beam 22. Internally reflected beam 26 travels through energy beam splitting device 10 and impinges on first surface 12 at a point 38.

Second surface 18, in addition to partially reflecting internally transmitted beam 22, also partially transmits internally transmitted beam 22 as an externally transmitted beam 24. Externally transmitted beam 24 is transmitted away from surface 18 of energy beam splitting device 10 at an angle of refraction $\rho$ with normal $N_1$. Since the index of refraction $\eta_1$ is less than the index of refraction $\eta$ the angle of refraction $\rho$ will be greater than the angle of incidence $\omega$. Externally transmitted beam 24 is the second primary useful beam produced by energy beam splitting device 10, and is used such as, for example, in a feedback circuit (not shown) to maintain the frequency and amplitude of the optical LASER beam 14 constant.

It should be understood that the angle of incidence $\omega$ between internally transmitted beam 22 and normal $N_1$ must be less than the critical angle necessary for total internal reflection for the given material energy beam splitting device 10 is made from so that internally transmitted beam 22 will be partially transmitted as externally transmitted beam 24. This is accomplished by intersecting first and second surfaces 12 and 18 respectively at the proper angle $\alpha$ (to be explained later) for a given frequency of energy beam 14, angle of incidence $\beta$, and index of refraction $\eta$ of energy beam splitting device 10.

Since externally reflected beam 20 and externally transmitted beam 24 are the primary useful beams, no other beams must be produced by energy beam splitting device 10 which would interfere with primary beams 20 and 24. This is accomplished by substantially totally internally reflecting internally reflected beam 26 within energy beam splitting device 10 until internally reflected beam 26 reaches end 28, that is, first and second surfaces 12 and 18 respectively must substantially totally internally reflect internally reflected beam 26 without substantially transmitting any portion of internally reflected beam 26 outside surfaces 12 and 18. Thus, the angles of reflection $\mu$, m, and l with normals N, $N_1$ and N at points 38, 40 and 42 respectively on first and second surfaces 12 and 18 must exceed the minimum angle, i.e. critical angle, necessary for substantially total internal reflection on energy beam splitting device 10 having an index of refraction $\eta$. Thus, to produce only two primary beams 20 and 24, angles $\gamma$ and $\omega$ must be less than the minimum angle, i.e. critical angle, necessary for substantially total internal reflection and angles $\mu$, m and l must exceed the critical angle. First and second surfaces 12 and 18 are formed at an angle $\alpha$ to each other so that each time a beam is internally reflected from first and second surfaces 12 and 18 the angle of reflection is greater than the preceeding angle of reflection thus insuring that the critical angle for substantially total internal reflection will be exceeded. Thus, angle $\omega$ will be greater than angle $\gamma$, angle $\mu$ will be greater than angle $\omega$, angle m will be greater than angle $\mu$, and angle l will be greater than angle m.

Although the critical angle necessary for substantially total internal reflection will be reached by forming first and second surfaces 12 and 18 at an angle $\alpha$, angles $\gamma$ and $\omega$ must be less than the critical angle and angles $\mu$, m and l must exceed the critical angle to produce only two primary externally transmitted beams 20 and 24. To produce the desired results the wedge angle $\alpha$ between first and second surfaces 12 and 18 respectively must have the following relationship:

$$\alpha < [\arcsin \eta_1/\eta - \arcsin(\eta_1/\eta \times \sin\beta)] \quad (1)$$

$$\alpha > \tfrac{1}{2}[\arcsin \eta_1/\eta - \arcsin(\eta_1/\eta \times \sin\beta)] \quad (2)$$

Relationships (1) and (2) define the limits in which wedge angle $\alpha$ must fall for a given energy beam 14 impinging on first surface 12 at an angle of incidence $\beta$ when energy beam splitting device 10 has an index of refraction $\eta$ and the surrounding medium has an index of refraction $\eta_1$. As shown by relationships (1) and (2), $\alpha$ may vary between $$1 [\arcsin \eta_1/\eta - \arcsin(\eta_1/\eta \times \sin\beta)]$$
and
$$0.5 [\arcsin \eta_1/\eta - \arcsin(\eta_1/\eta \times \sin\beta)]$$

and still insure that angle of incidence $\omega$ is less than the critical angle necessary for substantially total internal reflection and angle of incidence $\mu$ exceeds the critical angle necessary for substantially total internal reflection. It is preferred, however, that wedge angle $\alpha$ fall halfway between relationships (1) and (2) so that $$\alpha = 0.75[\arcsin \eta_1/\eta - \arcsin(\eta_1/\eta \times \sin\beta)]. \quad (3)$$

By way of example, the critical angle necessary for substantially total internal reflection is given by the equation $$\theta_c = \arcsin \eta_1/\eta \quad (4)$$

Where $\theta_c$ is the critical angle, $\eta_1$ is the index of refraction of the surrounding medium and $\eta$ is the index of refraction of energy beam splitting device 10. If, for example purposes only, energy beam splitting device 10 is made of zincselenide, the surrounding medium is air, and energy beam 14 has a frequency of 10.6 um then $\eta_1$ is unity and $\eta$ is 2.40. Equation (4) then gives the critical angle necessary for substantially total internal reflection as 24°37′. Also, it is assumed, for example purposes only, that energy beam 14 is incident on first surface 12 at an angle of incidence $\beta$ equal to 45°. The above figures when substituted in the aforementioned relationships (1) and (2) give, wedge angle $\alpha < 6°40′$ and wedge angle $\alpha > 3°20′$ and equation (3) gives wedge angle $\alpha$ equal to 4°59′.

As previously stated internally reflected beam 26 is reflected between first and second surfaces 12 and 18 until it reaches end 28. Preferably end 28 is not smooth like surfaces 12 and 18 but is formed with a plurality of spaced ridges 32 that extend the length of energy beam splitting device 10 if energy beam splitting device 10 is substantially rectangular in shape or ridges 32 extend around the circumference if energy beam splitting device 10 is disc shaped (not shown).

As internally reflected beam 26 strikes end 28 ridges 32 diffusely scatters internally reflected beam 26 as a plurality of weak beams 44. Weak beams 44 being scattered at many angles will have an intensity too weak to be detrimental to primary beams 20 and 24 should they interfere with primary beams 20 and 24.

First surface 12 may be coated with a partially reflective coating 46 that will increase the percentage of optical energy beam 14 reflected as externally reflected beam 20 from first surface 12. Any type of well-known and commercially available partially reflective coating may be used, however, it is preferred that specific partially reflective coatings be used for specific frequency ranges of optical energy beam 14 such as, for example, in the ultraviolet and visible frequency ranges coatings of aluminum oxide, zirchromium oxide, and titanium oxide are preferred and in the infrared frequency range coatings of zinc sulfide or thorium fluoride are preferred. The above partially reflective coating 46 is applied to first surface 12 in the known manner. It is preferred that a substantial number of layers of coatings be applied. The number and thickness of the layers of the coatigs will determine the amount of increase in the percentage of optical beam 14 reflected as externally reflected beam 20.

Second surface 18 may be coated with a substantially antireflective coating 48 that will increase the percentage of internally transmitted beam 22 transmitted as externally transmitted beam 24. The substantially antireflective coating 48 is of the same material as previously described for the partially reflective coating except that a relatively few coatings are applied in the known manner.

Referring to FIG. 4, energy beam splitting device 10 may also be used as a beam combiner. When used in this configuration a single optical energy beam 14 produced by an optical beam producing apparatus 16 is split into an externally reflected beam 20 and an externally transmitted beam 24 as previously described in FIG. 3 and therefore will not be further described.

A second optical energy beam 50 similar to optical energy beam 14 is produced by a second optical energy beam producing apparatus 52 such as, for example, a local optical oscillator (not shown) which is used in the receiver of an optical communication system (not shown). Optical energy beam 50 travels from optical energy beam producing apparatus 52 by an optical path to a point 54 on second surface 18 of energy beam splitting device 10. It is preferred that optical energy beam 50 impinge on second surface 18 at point 54 at an angle between normal $N_1$ and second surface 18 so as to form an angle of incidence $\kappa$.

Second surface 18 partially reflects optical energy beam 50 as an externally reflected beam 56 at an angle of reflection which is substantially the same as the angle of incidence $\kappa$ of optical energy beam 50. Externally reflected beam 56 is not a useful primary beam and thus it may be detrimental if allowed to interfere with the primary optical beams produced by optical energy beam 50, to be explained later, or the primary externally transmitted beam 24 produced from optical energy beam 14. Thus, preferably the angle of reflection $\kappa$ for externally reflected beam 56 is substantially less than the angle of refraction for externally transmitted beam 24 so that externally reflected beam 56 and externally transmitted beam 24 are diverging and thus will not interfere with each other. In addition, any conventional and well known optical energy absorber or trap may be placed in front of externally reflected beam 56 to absorb it so it does not interfere or conflict with the primary beams. In addition to producing externally reflected beam 56, second surface 18 partially transmits optical energy beam 50 as internally transmitted beam 58. Internally transmitted beam 58, travels through energy beam splitting device 10 to first surface 12.

Preferably, internally transmitted beam 58 impinges on first surface 12 at point 34 which is the same point where optical energy beam 14 impinges on first surface 12. First surface 12 partially transmits internally transmitted beam 58 as a first externally transmitted beam 60. First externally transmitted beam 70 propagates away from first surface 12 of energy beam splitting device 10 at an angle of refraction q. In addition, first surface 12 partially reflects internally transmitted beam 58 as a first internally reflected beam 62 having an angle of reflection t.

First externally transmitted beam 60 is the first primary useful beam produced from optical energy beam 50. Since in this configuration energy beam splitting device 10 is a beam combiner, externally reflected beam 20 and first externally transmitted beam 60 are combined to form a single first combined beam 64. First combined beam 64 is the first useful primry beam produced by energy beam splitting device 10 and can be used such as, for example, the beam that is to be detected by the conventional detector (not shown) in an optical communication receiver (not shown). To combine externally reflected beam 20 with first externally transmitted beam 60, first externally transmitted beam 60 must leave surface 12 at the same point 34 and at the same angle $\beta$ as externally reflected beam 20. Therefore, internally transmitted beam 58 must strike first surface 12 at substantially point 34 at an angle of incidence t that will produce an angle of refraction q for externally transmitted beam 60 that is substantially the same as the angle of reflection $\beta$ for externally reflected beam 20. Thus, the proper index of refraction $\eta$ of energy beam splitting device 10, the proper angle of incidence k of optical energy beam 50 and the proper point 54 on second surface 18 must be chosen to ensure externally reflected beam 20 will combine with first externally transmitted beam 60 to form first combined beam 64.

For illustration purposes only in FIG. 4 internally transmitted beam 58 is shown striking first surface 12 displaced from point 34 and thus first externally transmitted beam 60 is shown spaced from and parallel to externally reflected beam 20 so that the various paths of the various beams produced from optical energy beam 50 can be shown. It should be understood, however, that in actual practice the various beams produced from optical energy beam 50 after internally transmitted beam 58 impinges on first surface 12 will be parallel to and have the same optical paths as the various beams produced by optical energy beam 14.

To insure, as stated above, that internally transmitted beam 58 impinges on first surface 12 at point 34 and at an angle of incidence t that will transmit first externally transmitted beam 60 parallel to externally reflected beam 20, first internally reflected beam 62 parallel to internally transmitted beam 22, second externally transmitted beam 66 parallel to externally transmitted beam 24, and second internally reflected beam 70 parallel in internally reflected beam 26 the angle of incidence k of second optical energy beam 50 must be governed by the equation $$k = \arcsin[\eta/\eta_1 \times \sin(\arcsin(\eta_1/\eta \times \sin\beta) - \alpha)]. \quad (5)$$

Assuming for illustration purposes only that the parameters are the same as previously mentioned in the example given for FIG. 3, then substituting those parameters into equation (5) yields the angle of incidence k of second optical energy beam 50 as equal to 30°18'.

First internally reflected beam 62 is reflected from first surface 12 at point 34 at an angle of reflection t which is substantially the same as the angle of refraction $\gamma$ for internally transmitted beam 22 since angles $\beta$ and q are substantially the same for externally reflected beam 20 and first externally transmitted beam 60 respectively. Since first internally reflected beam 62 travels the same optical path as internally transmitted beam 22 it will impinge on second surface 18 at point 36 and at the same angle of incidence $\omega$ as internally transmitted beam 22.

Since first and second surfaces 12 and 18 respectively are formed at an angle $\alpha$, the angle of reflection t will be smaller than the angle of incidence $\omega$ and since the angle of incidence $\omega$ is less than the critical angle necessary for substantially total internal reflection as explained above for FIG. 3 the angle of reflection t will also be less than the critical angle thus both first externally transmitted beam 60 and first internally reflected beam 62 will be produced.

Since first internally reflected beam 62 impinges on second surface 18 at point 36 and at an angle of incidence less than the critical angle necessary for substantially total internal reflection, second surface 18 partially transmitts first internally reflected beam 62 as a second externally transmitted beam 66 at the same angle of refraction $\rho$ as externally transmitted beam 24. Since second externally transmitted beam 66 is parallel to and travels the same optical path as externally transmitted beam 24 they will combine to form a second combined beam 68 which is the second primary useful beam and can be used such as, for example, in a feedback circuit (not shown) for controlling the local oscillator (not shown) in the receiver of the optical communication system (not shown).

Second surface 18 also partially reflects first internally reflected beam 62 as second internally reflected beam 70. Second internally reflected beam 70 travels through energy beam splitting device 10 to a point 38 on first surface 12 since it is reflected from second surface 18 at the same angle of reflection $\omega$ as internally reflected beam 26 and thus will impinge on first surface 12 at the same angle of incidence $\mu$ as internally reflected beam 26. Since the angle of incidence $\mu$ exceeds the minimum angle necesary for substantially total internal reflection for the same reasons previously set forth for the invention shown in FIG. 3, second internally reflected beam 70 will be substantially totally internally reflected from first surface 12 at point 38 and consequently from second surface 18 at point 40 and first surface 12 at point 42 until it reaches end 28 for the same reasons previously set forth for the invention shown in FIG. 3.

When second internally reflected beam 70 reaches end 28, ridges 32 diffusely scatters it into a plurality of less intense beams 72 in the same manner as internally reflected beam 26 is diffusely scattered into beams 44.

The foregoing has disclosed a method and apparatus for splitting a beam of energy into two diverging beams of energy. The problems associated with producing secondary externally transmitted beams that interfere with the two primary useful externally transmitted beams has been eliminated by substantially totally internally reflecting the internally reflected beam after the two primary useful externally transmitted beams have been produced.

Accordingly, the invention having been described in its best embodiment and mode of operation, that which is desired to be claimed by Letters Patent is:

1. A method of forming two diverging beams of energy from a single beam of energy, comprising the steps of:
    a. impinging said single beam of energy on a first surface of a substantially transparent prism means, a cross-section of said prism means forming substantially truncated isosceles triangle sides, said cross-section being taken perpendicular to said sides, said sides having a base forming a wide end of said prism means, said prism means having an index of refraction substantially greater than a surrounding medium, and said single beam of energy being angled at said first surface toward said wide end of said prism means;
    b. splitting said single beam of energy into an externally reflected beam and an internally transmitted beam at said first surface, said internally transmitted beam traveling through said prism means toward a second surface angled toward said wide end;
    c. impinging said internally transmitted beam on said second surface at an angle of incidence that is less than the minimum angle necessary for substantially total internal reflection;
    d. splitting said internally transmitted beam into an internally reflected beam and an externally transmitted beam at said second surface, said internally reflected beam traveling through said prism means toward said first surface angled toward said wide end;
    e. impinging said internally reflected beam on said first surface at an angle of incidence that exceeds the minimum angle necessary for substantially total internal reflection; and
    f. reflecting said internally reflected beam between said first and second surfaces toward said wide end of said prism means for dispersal therefrom.

2. The method of claim 1 further including the step of forming said first and second surfaces at an angle to each other that impinges aid internally transmitted beam on said second surface at said angle of incidence that is less than said minimum angle and impinges said internally reflected beam on said first surface at said angle of incidence that exceeds said minimum angle.

3. The method of claim 1 further including the step of coating said first surface with a partially reflective coating to intensify said externally reflected beam.

4. The method of claim 1 further including the step of coating said second surface with an substantially anti-reflective coating to intensify said externally transmitted beam.

5. A method of forming a pair of combined beams of energy, comprising the steps of:

a. impinging a first beam of energy on a first surface of a substantially transparent prism means, a cross-section of said prism means forming substantially truncated isosceles triangle sides, said cross-section being taken perpendicular to said sides, said sides having a base forming a wide end of said prism means, said prism means having an index of refraction substantially greater than a surrounding medium, said first beam of energy being angled at said first surface toward said wide end of said prism means;

b. splitting said first beam of energy into an externally reflected beam and an internally transmitted beam at said first surface, said internally transmitted beam traveling through said prism means toward a second surface angled toward said wide end;

c. impinging said internally transmitted beam on said second surface at an angle of incidence that is less than the minimum angle necessary for substantially total internal reflection;

d. impinging a second beam of energy on said second surface and angling said second beam of energy at said second surface toward said wide end of said prism means;

e. splitting said second beam of energy into an externally reflected beam and an internally transmitted beam at said second surface, said internally transmitted beam traveling through said prism means toward said first surface angled toward said wide end;

f. impinging said internally transmitted beam on said first surface at an angle of incidence that is less than the minimum angle necessary for substantially total internal reflection;

g. splitting said internally transmitted beam, formed from said first beam, into an internally reflected beam and an externally transmitted beam at said second surface, said internally reflected beam traveling through said prism means toward said first surface angled toward said wide end;

h. impinging said internally reflected beam formed from said first beam on said first surface at an angle of incidence that exceeds the minimum angle necessary for substantially total internal reflection;

i. splitting said internally transmitted beam, formed from said second beam, into a first internally reflected beam and a first externally transmitted beam at said first surface, said first internally reflected beam traveling through said prism means toward said second surface angled toward said wide end;

j. impinging said first internally reflected beam formed from said second beam, on said second surface at an angle of incidence that is less than the minimum angle necessary for substantially total internal reflection;

k. splitting said first internally reflected beam, formed from said second beam, into a second internally reflected beam and a second externally transmitted beam at said second surface, said second internally reflected beam traveling through said prism means toward said first surface angled toward said wide end;

l. impinging said second internally reflected beam formed from said second beam, on said first surface at an angle of incidence that exceeds the minimum angle necessary for substantially total internal reflection;

m. combining said externally reflected beam, formed from said first beam, with said first externally transmitted beam, formed from said second beam, for forming a first combined beam of energy;

n. combining said externally transmitted beam, formed from said first beam, with said second externally transmitted beam, formed from said second beam, for forming a second combined beam of energy; and o. reflecting said internally reflected beam, formed from said first beam, and said second internally reflected beam, formed from said second beam, between said first and second surfaces toward said wide end of said prism means for dispersal therefrom.

6. The method of claim 5 wherein the step of substantially totally reflecting said second internally reflected beam formed from said second beam includes the steps of:

impinging said first internally reflected beam, formed from said second beam, on said second surface at an angle of incidence that is less than minimum angle necessary for substantially total internal reflection; and impinging said second internally reflected beam, formed from said second beam, on said first surface at an angle of incidence that exceeds the minimum angle necessary for substantially total internal reflection.

7. The method of claim 6 further including the step of forming said first and second surfaces at an angle to each other that impinges said internally transmitted beam, formed from said first beam, and said first internally reflected beam, formed from said second beam, on said second surface at said angle of incidence that is less than said minimum angle and impinges said internally reflected beam, formed from said first beam, and said second internally reflected beam, formed from said second beam, on said first surface at said angle of incidence that exceeds said minimum angle.

8. The method of claim 5 further including the step of coating said second surface with a substantially antireflective coating to decrease the intensity of said externally reflected beam, formed from said second beam, and to intensify said second combined beam.

9. An energy beam splitting device, comprising: prism means being substantially transparent, a cross-section of said prism means forming substantially truncated isosceles triangle sides, said cross section being taken perpendicular to said sides, said sides having a base forming a wide end of said prism means, and said prism means having an index of refraction substantially greater than a surrounding medium including;

a first surface extending perpendicular to said sides for splitting an incident beam of energy angled toward said wide end of said prism means into an externally reflected beam and an internally transmitted beam, said internally transmitted beam traveling through said prism means angled toward said wide end thereof, a second surface opposed from said first surface and extending perpendicular to said sides for intercepting and splitting said internally transmitted beam into an externally transmitted beam and into an internally reflected beam, said internally reflected beam traveling through said prism means to said first surface angled toward said wide end, said second surface intersecting said first surface at an angle that impinges said internally transmitted beam on said second surface at an angle of incidence that is less than the minimum angle necessary for substantially total internal reflection and impinges said internally reflected beam on said first surface at an angle of incidence that exceeds said minimum angle necessary for substantially total internal reflection toward said wide end, and said wide end having a series of spaced substantially parallel ridges along the length thereof for diffusely scattering said internally reflected beam away from said externally reflected and transmitted beams when said internally reflected beam emerges from said wide end.

10. The energy beam splitting device of claim 9 wherein said first surface is coated with a partially reflective coating for intensifying said externally reflected beam.

11. The energy beam splitting device of claim 9 wherein said second surface is coated with a substantially anti-reflective coating for intensifying said externally transmitted beam.

12. An energy beam combining device, comprising: prism means being substantially transparent, a cross-section of said prism means forming substantially truncated isosceles triangle sides, said cross section being taken perpendicular to said sides, said sides having a base forming a wide end of said prism means, and said prism means having an index of refraction substantially greater than a surrounding medium, including;

a first surface extending perpendicular to said sides for splitting a first incident beam angled toward said wide end of said prism means thereon into an externally reflected beam and an internally transmitted beam, said internally transmitted beam traveling through said prism means angled toward said wide end, a second surface opposed from said first surface and extending perpendicular to said sides for splitting a second incident beam angled toward said wide end of said prism means thereon into an externally reflected beam and an internally transmitted beam, said internally transmitted beam traveling through said prism means to said first surface angled toward said wide end, said second surface intercepting and splitting said internally transmitted beam, formed from said first beam, into an internally reflected beam and into an externally transmitted beam, said internally reflected beam traveling through said prism means to said first surface angled toward said wide end, said first surface intercepting and splitting said internally transmitted beam, formed from said second beam, into a first externally transmitted beam for combining into a first combined beam said first externally transmitted beam and said externally reflected beam, formed from said first beam, and into a first internally reflected beam, said first internally reflected beam traveling through said prism means to said second surface angled toward said wide end, said second surface intercepting and splitting said first internally reflected beam, formed from said second beam, into a second externally transmitted beam for combining into a second combined beam said second externally transmitted beam and said externally transmitted beam, formed from said first beam, and into a second internally reflected beam, said second internally reflected beam traveling through said prism means to said first surface angled toward said wide end, said second surface intersecting said first surface at an angle that impings said internally transmitted beam, formed from said first beam, and said first internally reflected beam, formed from said second beam, on said second surface at an angle of incidence that is less than the minimum angle necessary for substantially total internal reflection and impinges said internally reflected beam, formed from said first beam, and said second internally reflected beam, formed from said second beam, on said first surface at an angle of incidence that exceeds the minimum angle necessary for substantially total internal reflection toward said wide end, and said wide end having a series of spaced substantially parallel ridges along the length thereof for diffusely scattering said internally reflected beam, formed from said first beam, and said second internally reflected beam, formed from said second beam, away from said first and second combined beams when said internally reflected beam and said second internally reflected beam emerge from said wide end.

13. The energy beam combining device of claim 12 wherein said second surface is coated with a substantially anti-reflective coating for decreasing the intensity of said externally reflected beam, formed from said second beam, and for intensifying said second combined beam.

* * * * *